Dec. 22, 1964     K. V. STEWART     3,162,072
NUT RUNNER ATTACHMENT
Filed June 10, 1963
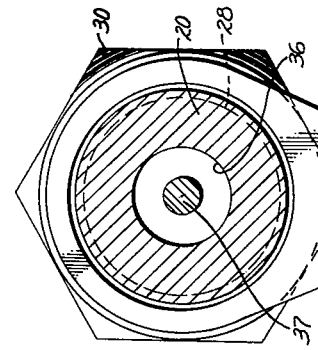
FIG. 4
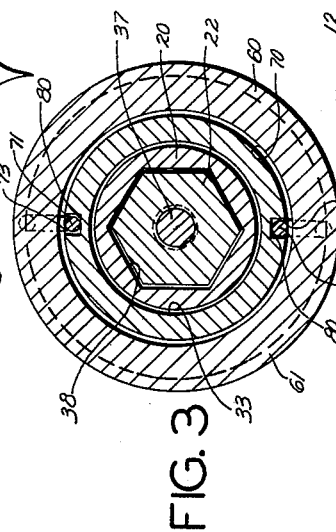
FIG. 6
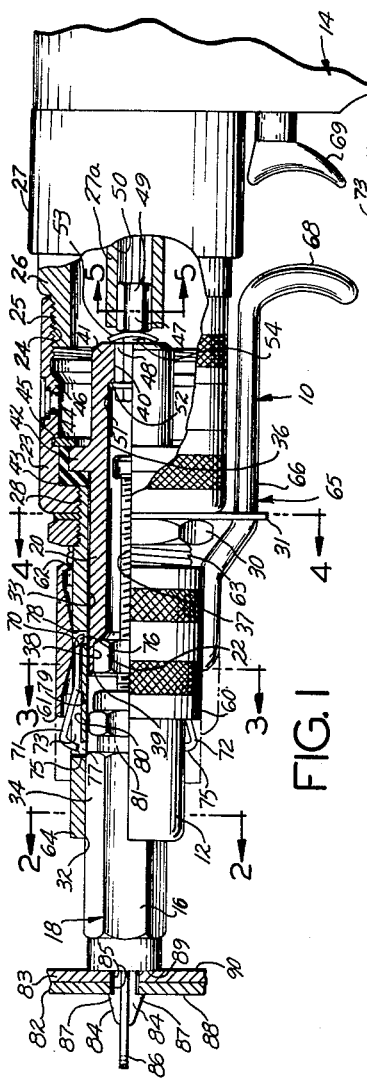
FIG. 1
FIG. 3
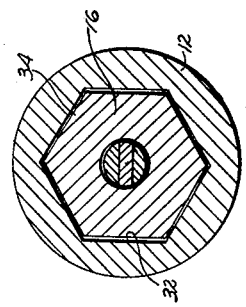
FIG. 2
FIG. 5
INVENTOR.
KENNETH V. STEWART
BY *R. E. Geangue*
ATTORNEY United States Patent Office 3,162,072
Patented Dec. 22, 1964

3,162,072
NUT RUNNER ATTACHMENT
Kenneth V. Stewart, Northridge, Calif., assignor to Wedgelock Corporation of California, North Hollywood, Calif., a corporation of California
Filed June 10, 1963, Ser. No. 286,715
2 Claims. (Cl. 81—55)

This invention relates to a nut runner attachment and more particularly to a nut runner attachment having a releasable locking means.

In the assembly of sheet metal skins or workpieces, particularly in the aircraft industry, there is a need for holding the workpieces during the assembly operation. Fastening devices are used for this purpose and are provided with a body member having a wrench engaging exterior configuration. Retractable pins are mounted in the body portion and are connected to a chuck member which is slidably and non-rotatably mounted inside the body portion. A threaded stud member is connected to the chuck and extends exteriorly of the body portion so that the stud may be engaged with a nut. Then when the nut is rotated while the body portion is prevented from being rotated, the pins will be protracted from or retracted into the body portion, as the case may be, depending upon the direction of rotation of the nut. The pins are provided with shoulder means adapted to engage one side of the workpieces and clamp them tightly between the shoulder means and the body portion when the pins are retracted sufficiently into the body portion.

The installation and removal of the releasable fastener is greatly accelerated by the use of a nut runner attachment which is designed to maintain the body portion in a nonrotative condition and rotate the nut portion. It is desirable to maintain the body portion against linear movement while the nut is being rotated. This is accomplished with the device of the present invention which is designed in such a manner that the nut runner attachment and the releasable locking device may both be operated with one hand. In addition, the device is normally biased to a locked position and has a trigger which may be actuated to release the locking means when a body portion is being removed from, or installed, in the nut runner attachment.

Therefore, it is an object of the present invention to provide a new and improved nut runner attachment.

It is another object of the present invention to provide a new and improved releasable locking means for a nut runner attachment which provides means for retaining the body of a fastener against axial movement within the nut runner attachment which the fastener is being installed on or removed from workpieces.

Yet another object of the present invention is to provide a new and improved releasable locking means for a nut runner attachment which is normally biased into a locked position.

A further object of the present invention is to provide a new and improved locking means of the type described which is easily and readily actuatable with one hand.

A still further object of the present invention is to provide a new and improved releasable locking means of the type described which is economical to manufacture and which may be used safely, efficiently and expeditiously.

According to the present invention, a nut runner attachment is provided with an outer tubular member and an inner, rotatable tubular member. The outer member is adapted to non-rotatably support the body portion of a fastening device while the inner member rotates the actuator nut portion of the fastening device. A releasable locking means is mounted on the outer member for engagement with the body portion to prevent axial movement thereof during operation of the nut runner attachment and to prevent dislodgment of the body portion while the releasable fastener is being carried to and from the workpieces. The releasable fastener is actuated by a spring biased sleeve having an internal cam which tips the locking means into locking engagement when the sleeve is biased on the outer member and which tips the locking means out of the locking engagement when the sleeve is slid to a second position by actuating a trigger to overcome the spring biasing the sleeve. The trigger is connected to the releasable locking means and is located closely adjacent the conventional trigger which operates the nut runner attachment so that both the nut runner attachment and the releasable locking means may be operated with one hand.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a longitudinal, cross-sectional view of a releasable locking means of the present invention as associated with a fastener, with parts shown in elevation;

FIGURE 2 is a transverse, cross-sectional view taken along line 2—2 of FIGURE 1;

FIGURE 3 is a transverse, cross-sectional view taken along line 3—3 of FIGURE 1;

FIGURE 4 is a transverse, cross-sectional view taken along line 4—4 of FIGURE 1;

FIGURE 5 is a transverse, cross-sectional view taken along line 5—5 of FIGURE 1; and FIGURE 6 is a longitudinal, cross-sectional view, similar to the left hand portion of FIGURE 1 showing the locking means thereof in an actuated position.

Referring again to the drawings, a releasable locking means of the present invention generally designated 10, is illustrated as being mounted on a first tubular member 12 of a nut runner 14 which is substantially similar to the nut runner attachment described and claimed in co-pending application, Serial No. 121,086 filed June 30, 1961, and assigned to the assignee of the instant application.

The first tubular member 12 supports the body portion 16 of a releasable fastener 18 in non-rotative relationship while a substantially co-axial, inner, rotatably-driven tubular member 20 engages a nut 22 forming the actuator portion of the fastener 18. The driven member 20 rotates the actuator 22 relative to the body portion 16 of fastener 18.

The nut runner attachment 14 includes a body member 23 which has internal threads 24 threadedly engaging the external threads 25 formed on a boss 26 of a housing 27. The housing 27 forms a part of a motor or other drive means (not shown) having a driven shaft 27a which drives the driven tubular member 20. The outer tubular member 12 is non-rotatably secured by a threaded connection 28 to the body member 23. A lock nut 30 is employed to lock the outer tubular member 12 against rotation and also to lock a guide member 31 against rotation.

The outer tubular member 12 is provded with an axial bore 32 of non-circular configuration and a cylindrical counter-bore 33 which is co-axial and co-extensive with bore 32. The non-circular bore 32 is adapted to hold the body portion 16 of the fastener 18 in non-rotative, but axially movable, relationship to bore 32 by engagement of the bore 32 with lands 34 on the body portion 16. Thus, the body portion 16 may be easily and readily inserted into the bore 32 and removed therefrom.

The driven member 20 is rotatably disposed within the cylindrical bore 33 of the outer tubular member 12 and includes a cylindrical bore 36 providing clearance for the stud portion 37 of the fastener 18. A counter-bore 38 of non-circular configuration and complementary to the outer configuration of the actuator nut 22 is also provided in the tubular member 20 to receive the nut 22 in non-rotative relationship thereto. The counter-bore 38 is formed in one end 39 of the tubular member 20 adjacent the non-circular bore 32 of the outer tubular member 12. The inner tubular member 20 further includes a reduced, non-circular bore 40 adjacent the other end 41 thereof and bores 38, 36 and 40 are substantially co-axial.

The driven member 20 is held against axial movement relative to the body member 23 and the outer tubular member 12 by an annular flange 42 abutting a cup-shaped thrust bearing 43 and a split ring 44. The split ring 44 is mounted in a groove 45 formed in an enlarged bore 46 on the body member 23. The thrust bearing 43 is preferably made of a resilient, plastic material having a low co-efficient of friction.

A connector 47 detachably connects the inner tubular member 20 and the driven shaft 27a to translate rotation of the shaft 27a into rotation of the member 20. The connector 47 comprises a shaft having a non-circular portion 48 complementary to the non-circular, reduced bore 40 of the tubular member 20 and an opposed, similar non-circular portion 49 co-axial thereto slidably received in a socket 50 formed in the driven shaft 27a. The connector 47 is removably secured to the tubular member 20 by a split ring 51, which is slidably mounted in the bore 36 and abuts a shoulder 52 and by a spring washer 53, which engages a reduced portion 54 of the connector 47 and abuts the end 41 of the inner tubular member 20. It will be noted that the connector 47 is adapted to automatically engage the socket 50 when the body member 23 is secured to the boss 26.

The locking means 10 includes a sleeve member 60 having an encompassing sidewall 61 and an inturned flange 62 and is slidably mounted on the outer tubular member 12. A compression spring 63 encompasses the outer tubular member 12 and bears against nut 30 and the flange 62 to bias the sleeve member 60 toward the end 64 of tubular member 12. A trigger member 65 is rigidly affixed to the sleeve member 60 and includes a guide portion 66 extending through an aperture 67 in the guide member 31. The trigger member 65 also includes a grip portion 68 which is located adjacent the trigger 69 on the nut runner 14 so that either trigger 65 or 69 may be manipulated with the same finger of an operator of the device.

The sleeve member 60 also includes an internal cam member 70 which slidably engages an upper locking wire 71 and a lower locking wire 72 mounted in upper and lower slots 73 and 74, respectively, which are formed in the member 12. The wires 71 and 72 each include a first projection 75 and a second projection 76 which are adapted to penetrate apertures 77 and 78, respectively, mounted at opposed ends of each of the slots 73 and 74. Each of the wires 71 and 72 has a bowed portion 79 near its mid-section so that the wires will rock or tilt upon a ledge 80 forming the base of each slot. When the sleeve member 60 is slid to its normal, biased position, as shown in FIGURE 6, the cam 70 rocks the wires 71 and 72 so that the projections 75 penetrate the apertures 77 and extend into the bore 32 of the outer member 12 to engage an annular groove 81 formed on the fastener 18. When the trigger member 65 is actuated to slide the sleeve member 60 toward the nut 30, as shown in FIGURE 1, the cam 70 rocks the wires 71 and 72 so that the projections 75 are withdrawn from the bore 32 and the projections 76 are depressed into the apertures 78 to release the engagement of the projections 75 with the annular groove 81 so that the fastener 18 may be removed from the outer tubular member 12. Thus, the trigger 65 must be actuated to insert or remove the fastener 18 and when the trigger 65 is released, the wires 71 and 72 will automatically lock the fastener 18 into the outer tubular member 12. This is an important feature of the invention because it prevents the fastener 18 from becoming dislodged both when it is being carried in the nut runner 14 and when the nut runner 14 is in operation.

While the fastener 18 may be one of several types designed to clamp a pair of workpieces 82 and 83 together, it is shown for purposes of illustration, but not of limitation, as including a pair of protractable and retractable wires or pins 84 which are inserted into apertures 85 in workpieces 82 and 83 and are then spread apart by a spreader bar 86 as shown in FIGURE 1, when the nut 22 is rotated in one direction causing wires 84 to be retracted into the fastener 18. This locks the heads 87 of the pins 84 against the side 88 of the workpiece 82 to clamp the workpieces 82 and 83 between the heads 87 and a work engaging surface 89 of the fastener 18, which abuts one side 90 of workpiece 83. The nut runner 14 actuates the pins 84 by translating rotation of the driven shaft 27a into rotation of the inner tubular member 20 which, in turn, engages the nut 22 of the fastener 18 while the body portion 16 is non-rotatably secured in the bore 32. When the driven shaft 27a is rotated in one direction, the nut 22 is rotated in one direction to retract the threaded stud 37 which is connected to the pins 84. When the driven shaft 27a is rotated in an opposite direction, the nut 22 is rotated in the same opposite direction to move the stud 37 axially so as to extend the pins 84 and release the workpieces 82 and 83.

Operation of the device will be readily understood. An operator of the device may grip the nut runner attachment 14 with one hand and engage the grip portion 68 of the trigger 65 with his index finger to retract the sleeve 60 toward nut 30. This cams the projections 75 of the lock wires 71 and 72 out of the bore 32 so that the outer tubular member 12 is free to receive a fastener 18. The operator of the device may then insert the fastener 18 into bore 32 with his other hand and release the trigger member 65 so that the spring 63 will move the sleeve member 60 toward the end 64 of tubular member 12 causing the cam 70 to rock the wires 71 and 72 within the slots 73 and 74 and depress the projections 75 into the apertures 77 so that they extend into the bore 32 and engage the annular groove 81 on the fastener 18. This locks the fastener 18 against axial movement while it is being carried to the workpieces 82 and 83 and also prevents axial movement of the fastener 18 during the clamping and unclamping operations.

While the particular releasable locking means for a nut runner herein shown and described in detail is fully capable of attaining the objects and providing the advantages hereinbefore stated, it is to be understood that it is merely illustrative of the present preferred embodiment of the invention and that no limitations are intended to the details of construction or design herein shown other than as defined in the appended claims.

What is claimed is:

1. A releasable locking means for a nut runner having a first tubular member adapted to internally support an outer body of a fastener having a non-circular outer configuration in non-rotative relationship to the first member and a second, driven tubular member co-axial to said first tubular member and adapted to engage an actuator nut of non-circular configuration for rotation thereof to axially move a stud of said fastener in said second tubular member while rotating the actuator nut with the second tubular member, said releasable locking means comprising:

a slot in said first tubular member, said slot extending along said first tubular member parallel to the major axis thereof;

an aperture in said first tubular member adjacent said slot, said aperture extending into the interior of said first tubular member;

detent means mounted in said slot, said detent means having a portion engageable with said aperture to extend into said first tubular member into engagement with said fastener body;

a sleeve member slidably mounted on said first tubular member, said sleeve member encompassing said slot and said tubular member and having a cam slidably engaging said detent means for selectively depressing said detent means into engagement with said fastener body; and trigger means attached to said sleeve member for sliding said cam unpon said detent means.

2. The locking means of claim 1 wherein said detent means comprises:

a bowed wire rockably mounted in said slot, said wire including a projection engageable with said aperture when said cam is slid along said wire.

References Cited by the Examiner

UNITED STATES PATENTS

| 847,596 | 3/07 | McMurtry | 81—125 |
| 2,479,225 | 8/49 | Gann | 81—56 |
| 2,789,597 | 4/57 | LaTorre | 81—55 |
| 2,872,837 | 2/59 | Kise | 81—55 |
| 2,896,489 | 7/59 | Madsen | 81—124.1 |

FOREIGN PATENTS 225,670  12/24  Great Britain.

WILLIAM FELDMAN, *Primary Examiner.*